(12) United States Patent
Miller

(10) Patent No.: US 8,988,729 B2
(45) Date of Patent: Mar. 24, 2015

(54) SYSTEM AND METHOD FOR PRINTING A PHARMACEUTICAL LABEL

(71) Applicant: Mark H. Miller, Ayer, MA (US)

(72) Inventor: Mark H. Miller, Ayer, MA (US)

(73) Assignee: Medimind, LLC, Ayer, MA (US)

( * ) Notice: Subject to any disclaimer, the term of this patent is extended or adjusted under 35 U.S.C. 154(b) by 0 days.

(21) Appl. No.: 13/868,386

(22) Filed: Apr. 23, 2013

(65) Prior Publication Data

US 2013/0278948 A1 Oct. 24, 2013

Related U.S. Application Data

(60) Provisional application No. 61/637,792, filed on Apr. 24, 2012.

(51) Int. Cl.
| | | |
|---|---|---|
| G06F 3/12 | (2006.01) |
| G06F 15/00 | (2006.01) |
| G06K 15/00 | (2006.01) |
| H04N 1/40 | (2006.01) |
| G06K 15/02 | (2006.01) |
| G09F 3/02 | (2006.01) |
| G09F 3/10 | (2006.01) |

(52) U.S. Cl.
CPC .............. G06K 15/024 (2013.01); G09F 3/02 (2013.01); G09F 3/10 (2013.01); *G09F 2003/0272* (2013.01)
USPC .............. 358/1.6; 503/200; 462/67; 705/3

(58) Field of Classification Search
USPC .............. 358/1.15; 235/385, 375; 215/230
See application file for complete search history.

(56) References Cited

U.S. PATENT DOCUMENTS

| | | | | |
|---|---|---|---|---|
| 4,159,129 A * | 6/1979 | Lockhart | ............... | 462/67 |
| 4,277,089 A * | 7/1981 | Lockhart | ............... | 462/67 |
| 6,304,849 B1 * | 10/2001 | Uecker et al. | ............... | 705/3 |
| 6,672,214 B1 * | 1/2004 | Bartholet et al. | ............... | 101/485 |
| 7,000,791 B2 * | 2/2006 | Miller | ............... | 215/230 |
| 7,810,726 B2 * | 10/2010 | de la Huerga | ............... | 235/385 |
| 2002/0171238 A1 * | 11/2002 | Kozlowski et al. | ............... | 283/81 |
| 2006/0054682 A1 * | 3/2006 | de la Huerga | ............... | 235/375 |
| 2006/0097516 A1 * | 5/2006 | Kozlowski et al. | ............... | 283/117 |
| 2006/0216772 A1 * | 9/2006 | Grinstaff et al. | ............... | 435/7.93 |
| 2006/0263830 A1 * | 11/2006 | Grinstaff et al. | ............... | 435/7.2 |
| 2007/0031992 A1 * | 2/2007 | Schatz | ............... | 438/107 |
| 2008/0093448 A1 * | 4/2008 | de la Huerga | ............... | 235/385 |

* cited by examiner

*Primary Examiner* — Akwasi M Sarpong

(57) ABSTRACT

A method and system of printing a pharmaceutical label is disclosed. The method and system includes a mechanism for receiving patient prescription information, with is entered into a prescription entry system. The vial size may be calculated based on the patient prescription information. Spacing for printing dosing indicia on a pharmaceutical label is calculated and printed on the pharmaceutical label. The pharmaceutical label may then be applied to a vial, which may include an indexing mechanism to aid tracking of doses.

22 Claims, 5 Drawing Sheets

SYSTEM AND METHOD FOR PRINTING A PHARMACEUTICAL LABEL

CROSS-REFERENCE TO RELATED APPLICATION

This patent document claims priority to earlier filed U.S. Provisional Application Ser. No. 61/637,792, filed Apr. 24, 2012, the entire contents of which are incorporated herein by reference.

BACKGROUND OF THE INVENTION

1. Field of the Invention

The present patent document relates generally to prescription pill vials and more particularly to a method and system for printing a pharmaceutical label that include indicia for tracking doses, which may be used with pill vials that include an indexing mechanism.

2. Background of the Related Art

Keeping track of doses for prescriptions can be confusing to patients. Although others have described indicators for time intervals. For instance, U.S. Pat. No. 7,000,791 describes using an indicator on the vial closure to track the number of pills taken. However, the '791 patent does not describe how many doses remain or how many doses have already been taken, which is arguably a more useful measure. Furthermore, the '791 patent is fixed in that if the user is on a non-standard medication regime, the '791 patent is not easily adaptable Therefore, there is a perceived need in the art for a dosage tracking mechanism for pill vial that is specific to the patient and medication that the patient has been prescribed, yet is also inexpensive and easy to use.

SUMMARY OF THE INVENTION

The system and method for printing a pharmaceutical label for a prescription vial solves the problems of the prior art by providing a pharmaceutical label that is printed with spaced-apart indicia indicating doses to be taken by the patient. Used stand alone or with a pill vial that includes an indexing mechanism or dose indicator, the patient can easily track their specific medication regime, leading to better compliance and fewer medication accidents.

The system may be implemented on general purpose computers or on inexpensive electronic appliances, using custom software to calculate proper vial size, pharmaceutical label size and spacing and printing of the indicia on the pharmaceutical label.

BRIEF DESCRIPTION OF THE DRAWINGS

These and other features, aspects, and advantages of the present invention will become better understood with reference to the following description, appended claims, and accompanying drawings where:

FIG. 4b is an exploded bottom perspective view of the pill vial with dosage indicator shown in FIG. 4a.

DESCRIPTION OF THE PREFERRED EMBODIMENT

Figure 1:
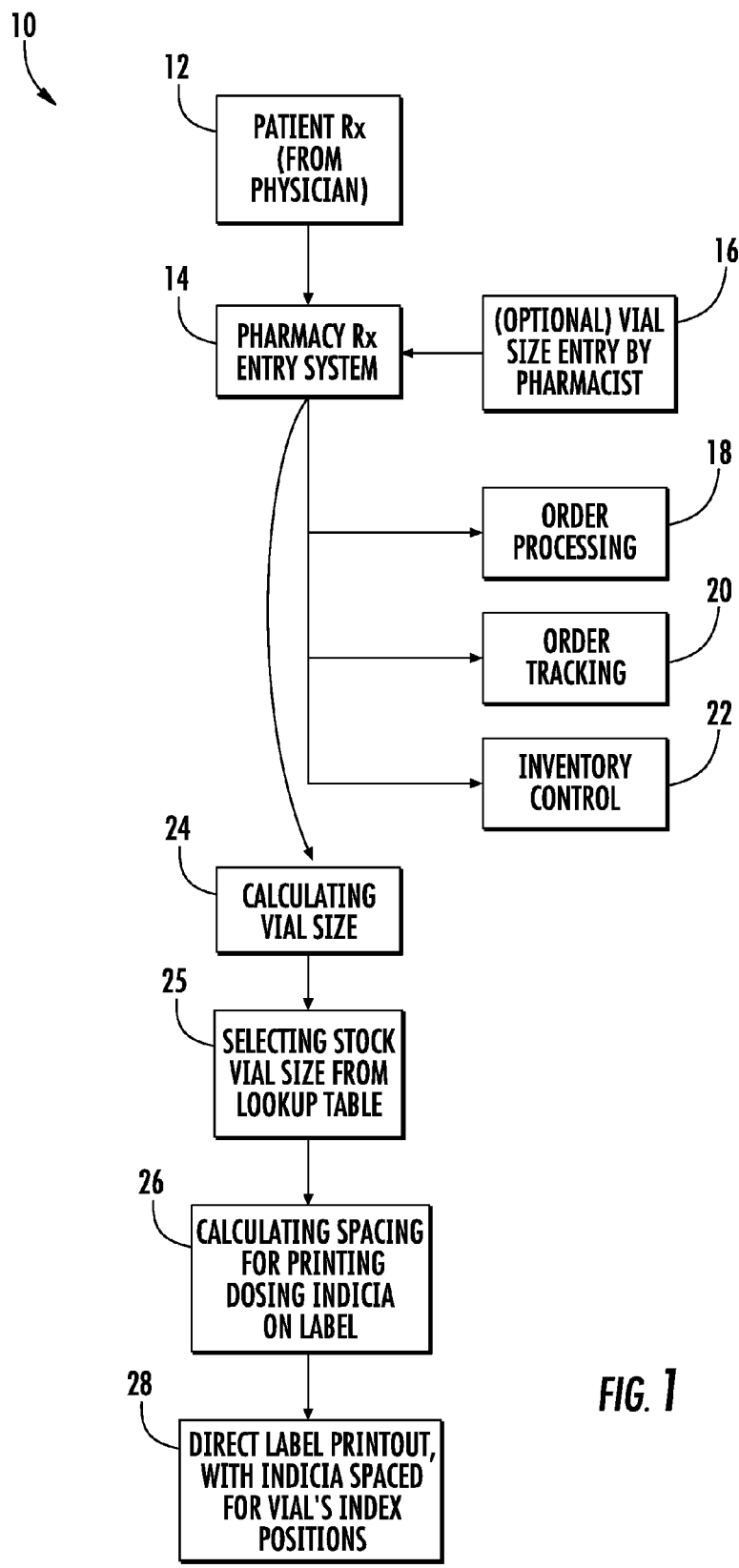
FIG. 1 is a flow chart illustrating the method and system for printing a pharmaceutical label.
Figure 2:
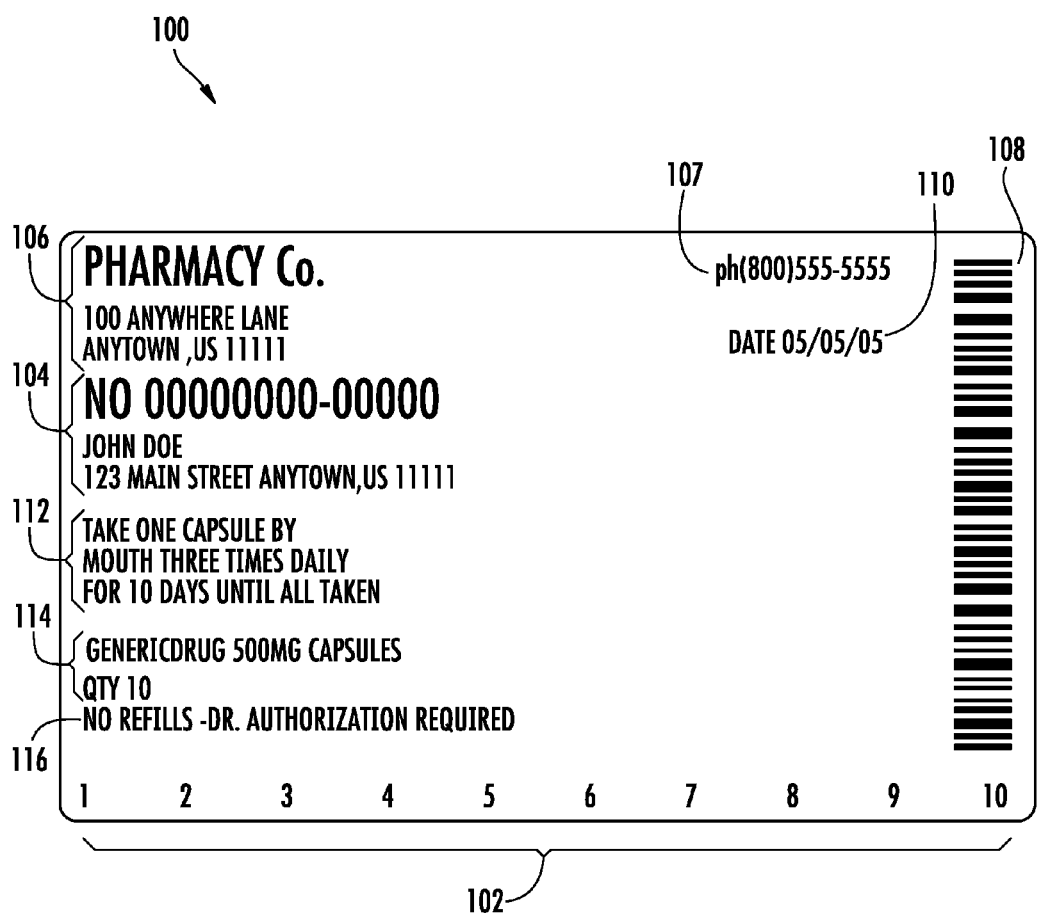
FIG. 2 is an exemplary pharmaceutical label.

Referring to FIGS. 1 and 2, a flow chart illustrating the method and system for printing a pharmaceutical label 10 and a pharmaceutical label 100 printed according thereto are shown, respectively.

The method and system may be implemented on general purpose computers with software running thereon, preferably in a networked environment. However, isolated computers may be used and specialized hardware implementations, i.e. appliances, may also be used. Generally speaking, the system includes a database system that stores patient prescription information, pharmacy inventory, open orders, order tracking information, among others. The system may track vial size and vial inventory as well.

Prescription information is first received from the physician or other medical professional, at step 12. The system may be configured to receive the information electronically, such as through the internet. However, prescription information may be manually entered by a pharmacist or technician, as the case may be for the instance where written prescriptions and telephone prescriptions are used.

The pharmacist or technician enters the prescription information in the pharmacy prescription entry system, at step 14. At this juncture, the pharmacist or technician may enter the size of the vial intended to be used to fill the prescription, at step 16, which ensures that the proper label size is selected for printing the prescription information thereon (described further below).

From here, the pharmacist or technician may enter order processing 18, order tracking 20, and inventory control 22 modules. Each module permits the pharmacist or technician to enter, retrieve, or manage information within the system. In the order processing module 16, the pharmacist or technician may complete the order for the prescription, up to and including payment processing from the patient. The order tracking module 20 permits the pharmacist or technician to search for and review the current state of any prescription information stored in the system, such as, but not limited to, filed, delivered, awaiting filling, error, and other codes as the case may be. The inventory control module 22 permits the pharmacist or technician to examine the state of the current stock of medications and supplies at the pharmacy.

After the pharmacist or technician has entered the patient prescription information into the system, and if the pharmacist or technician has not entered the vial size at step 16, the vial size may be calculated at step 24. Based on the dimensions of a particular pill size and the number of doses in the prescription, the total volume may be calculated for the prescription and the proper size pill vial 200 may be selected to hold the prescription.

Once the proper vial size is determined 24, the vial may be selected from the available stock of vials that is large enough to hold the entire prescription at step 25. One manner of doing so is using a lookup table that includes vial sizes and the associated label 100 for that vial.

Once the proper vial is selected 25, the correct size label 100 may be selected and the dosing information may be prepared for printing on the label 100 at step 26. For cylindrical pill vials, indicia 102, indicating dosing information, may be spaced equally around a bottom edge of the label 100. As described further below, the indicia 102 form part of a mechanism for easily tracking dosing. Alternatively, the patient may mark the indicia 102 with pen or other writing implement, checking off doses as they are taken.

The label 100 may include other information as well, such as patient prescription information 104, pharmacy information 106 and phone number 107, machine-readable barcodes 108, the date the prescription was filled 110, instructions for consumption 112, pharmaceutical information and quantity 114, and refill instructions 116. Other information may be provided, such as the prescribing physician. The label 100 includes an printable substrate that may have patient prescription information and indicia printer thereon by a printer. Preferably, the label 100 also includes an adhesive on a rear face of the substrate so that the label 100 may be easily applied to a vial.

Figure 3A:
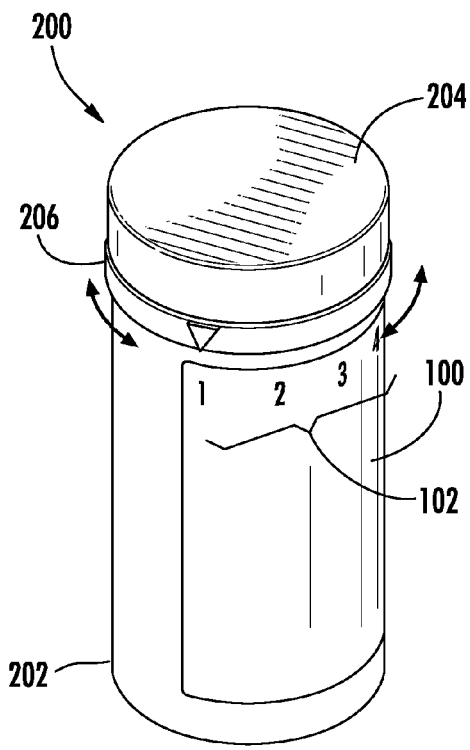
FIG. 3a is a perspective view of an embodiment of a pill vial with a dosage indicator formed as part of the closure.
Figure 3B:
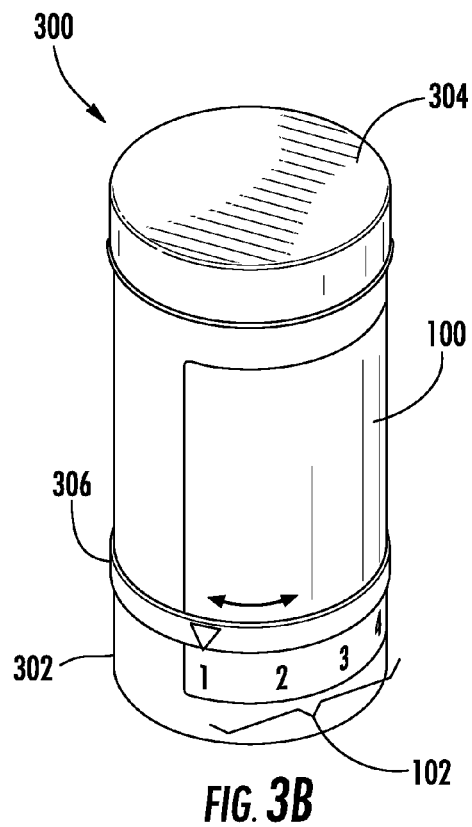
FIG. 3b is a perspective view of an embodiment of a pill vial with a dosage indicator formed as a band rotatable around the vial.
Figure 3C:
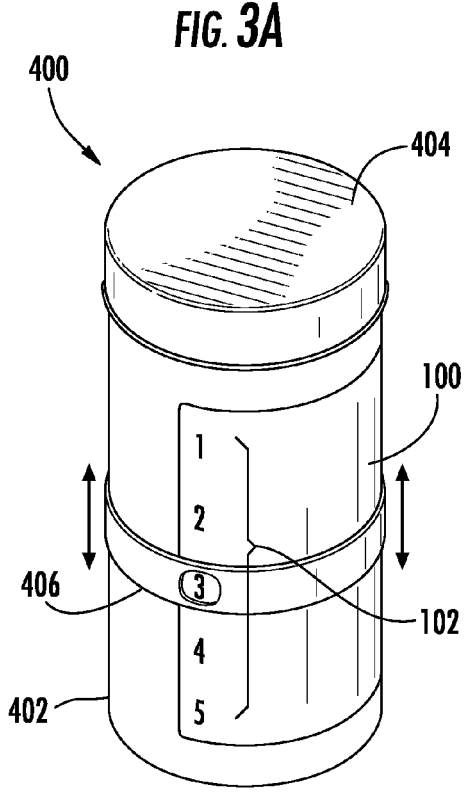
FIG. 3c is perspective view of an embodiment of a pill vial with a dosage indicator formed as a band slidable along the vial.
Figure 3D:
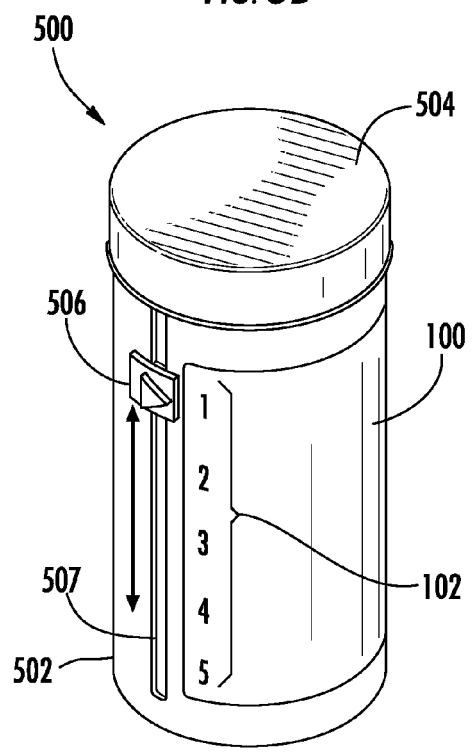
FIG. 3d is a perspective view of an embodiment of a pill vial with a dosage indicator slidable in track integrally formed as part of the vial.

Referring now to FIGS. 3a-d, four different embodiments of vials are shown generally at 200, 300, 400, and 500. Although the indicia 102 are shown printed on the bottom portion of the label 100, the indicia 102 may be aligned on the label 100 to correlate to another style indexing mechanism 206, 306, 406, 506. For instance, the indicia 102 may be printed on the top edge of the label 100 to align with an indexing mechanism 206 that is formed as part of the closure 204 or the top of the vial 202, as shown in FIG. 3a. Or as shown in FIGS. 3b and 3c, a band of resilient material with an indexing mark thereon 306, 406, such as an embossed arrow or cutout window, may also be used to track the current dose on the indicia 102. The band 306, 406 may rotate are slide, respectively, on the vial 302, 402. In this regard, the indicia 102 may be printed anywhere on the label 100, including along the length of the vial (i.e. vertically as shown in FIGS. 3c and 3d) instead of the circumference (as shown in FIGS. 3a and 3b). Referring to FIG. 3d, the indicia 102 may be oriented lengthwise on the label 100 for an indexing mechanism 506 configured to slide within a track 507 laterally along the length of the vial 502. The track may be integrally molded into the vial 502.

Figure 4A:
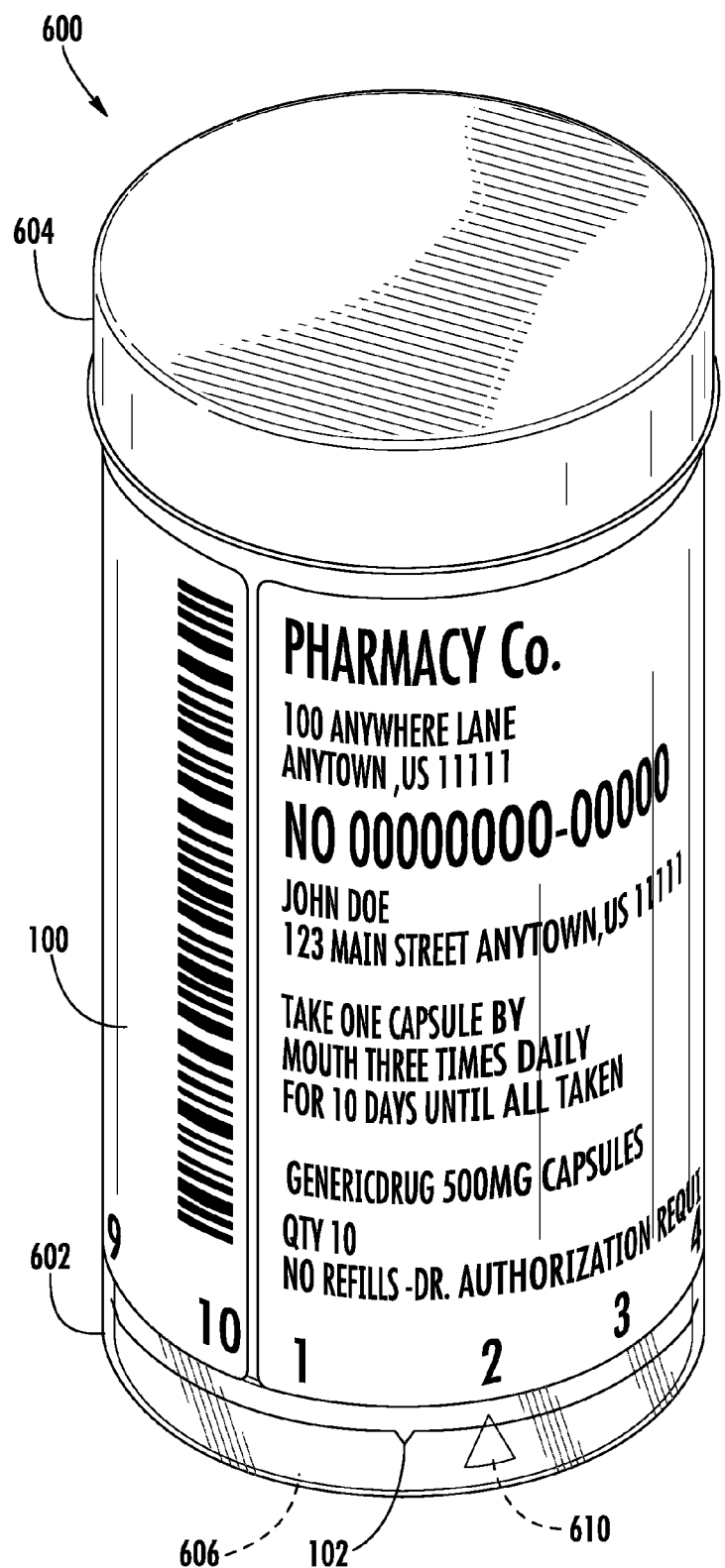
FIG. 4a is a top perspective view of an embodiment of a pill vial with dosage indicator showing a pharmaceutical label thereon.
Figure 4B:
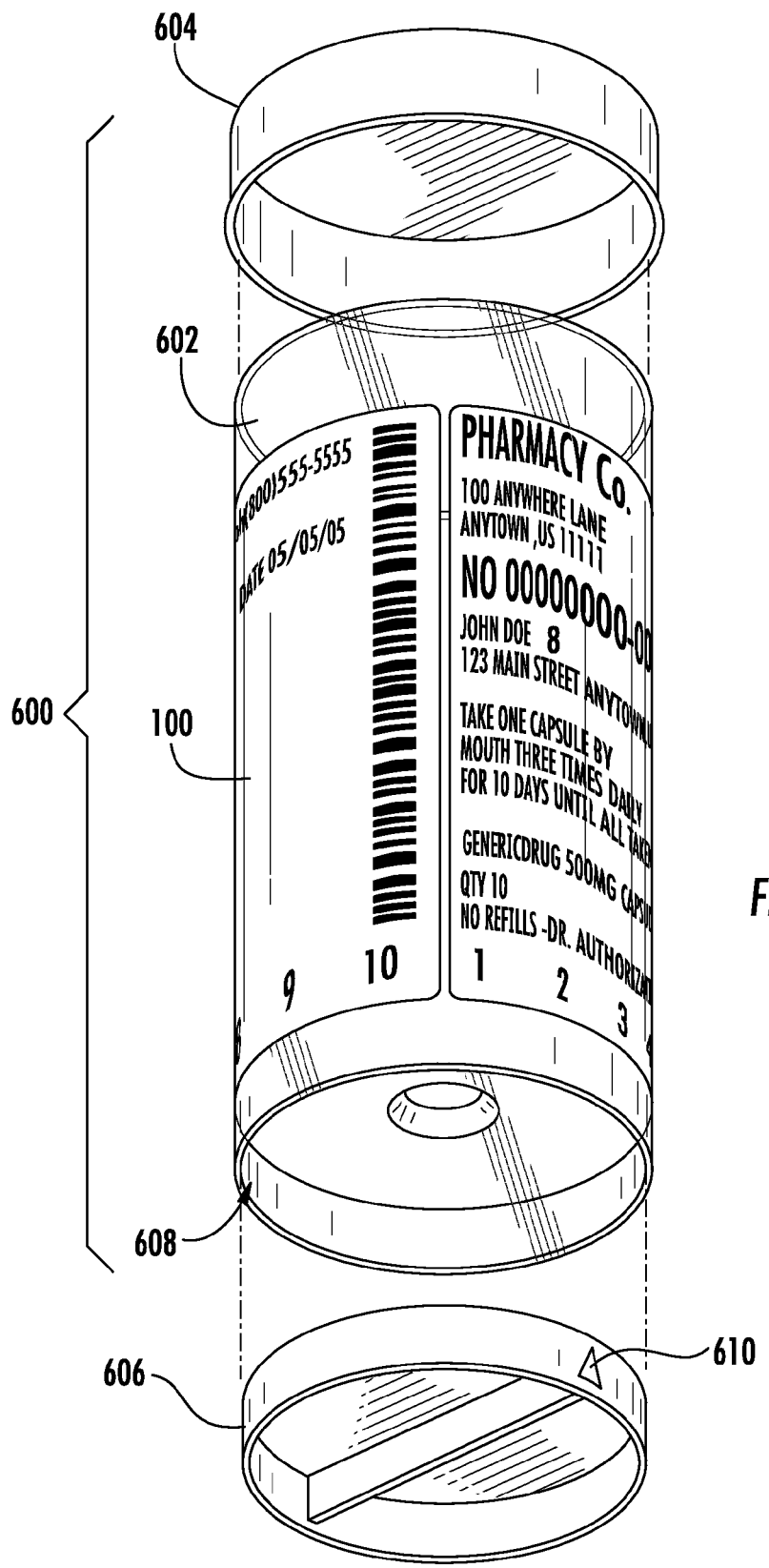

Referring now to FIGS. 4a and 4b, a pill vial with dosage indicator is shown generally at 600. As will be described in more detail below, the pill vial generally includes a vial 602, a closure 604, and indicator 606 and some manner of indicia 102 on the vial, such as a pharmaceutical label 100, described above.

The pill vial includes 600 a vial having a sidewall and a bottom forming an enclosure for prescription medications. The top of the vial is open, but is adapted to receive a closure, which may be tamper evident and/or childproof as is known in the art. The sidewall extends below the bottom forming a cavity 608 beneath the enclosure.

Indicia 102 indicating the numbers of pills taken per day are printed, embossed, or otherwise formed circumferentially around the sidewall of the vial 602. Preferably the indicia 102 are printed on the prescription label 100 that is applied to the sidewall of the vial 602 as described above. Printing the indicia 102 on the prescription label 100 has is more advantageous because a single "stock" vial and indictor may be used to fill all prescriptions, yet each prescription can uniquely convey to the patient the number of dosages prescribed because the dosage information is printed on the prescription label 100 at the time the prescription is filled, as described above. The indicia 102 may also be printed on separate labels that may be applied to the vial 602 as well.

The indicator 606 is configured and arranged to snap into the cavity 608 on the vial 602 and rotate therewithin. The indicator 606 is rotatably moveable to any one of twelve equally spaced detent positions. The indicator 606 has an index mark 610 such as a visible arrow, pointer, or some other identifying feature molded, printed, or embossed upon it for the purpose of aligning with the indicia 102 which are disposed circumferentially around the lower end of the label 100.

The indicator 606 could also include a rib, ridge, depressions, or other surface features or texture to enable a secure grip with the user's fingers, to assist in rotating the indicator against the resistance of the detent as is known in the art and need not be specifically described herein.

The detent features on the indicator 606 and vial 602 can take a number of shapes and designs as is well known in the art and need not be specifically described herein. Because the vial 602 and indicator 606 are made from injection molded plastic, the flexing action of the plastic of the indicator 606y and the vial 602 allow the indicator to overcome the resistance of the detent when sufficient finger-torque is applied to it. The indicator 606 is inset within the side wall of the vial 602. The arrow or pointer 610 on the indicator 606 is visible through the transparent or translucent side wall of the vial 602.

Alternatively, the indicator 606 may depend below the cavity 608 and be visible to the user directly. Also, the sidewall may include cutouts that may function as detent locations and indicia where the current position of the indicator 606 is visible through the cutouts.

Therefore, it can be seen that the present invention provides a unique solution to the problem of providing a method and system to track doses for patient prescriptions. The method and system provides a custom pharmaceutical label that includes spaced-apart indicia representing doses the patient is scheduled to take. Used in conjunction with a prescription pill vial with a dosage indicator, the patient may easily track doses taken, preventing overdosing or under-dosing, and otherwise ensuring higher compliance rates with the prescribed medication regime.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A method of printing a pharmaceutical label, comprising:
   providing patient prescription information;
   calculating linear spacing for printing dosing indicia on a dimension of a pharmaceutical label, the dosing indicia indicating incremental doses in the prescription; and
   printing the pharmaceutical label with the patient prescription information and dosing indicia thereon, the dosing indicia spaced equally in a single, linear row on one dimension of the pharmaceutical label.

2. The method of claim 1, further comprising processing a prescription order.

3. The method of claim 1, further comprising tracking a prescription order.

4. The method of claim 1, further comprising automatically checking available inventory of vials.

5. The method of claim 1, further comprising entering a vial size.

6. The method of claim 1, further comprising calculating a vial size based on the patient prescription information.

7. The method of claim 6, further comprising selecting a vial size large enough to contain the entire prescription from the patient prescription information.

8. The method of claim 1, printing the indicia on a bottom edge of a pharmaceutical label.

9. The method of claim 1, wherein the indicia are spaced equally apart according to a circumference of a vial.

10. A system for printing a pharmaceutical label, comprising:
   an entry system configured and arranged to receive patient prescription information;
   a code module configure and arranged to calculate linear spacing for printing dosing indicia on a dimension of a pharmaceutical label, the dosing indicia indicating incremental doses in the prescription;
   a printer configured and arranged to print a pharmaceutical label with dosing indicia spaced-apart thereon, the dosing indicia spaced equally in a single, linear row on one dimension the pharmaceutical label.

11. The system of claim 10, further comprising a general purpose computer configured and arranged to display the entry system and run the code module.

12. The system of claim 10, further comprising a order processing module configured and arranged to accept and process a prescription order.

13. The system of claim 10, further comprising an order tracking module configured and arranged to track a prescription order.

14. The system of claim 10, further comprising an inventory control module configured and arranged to track available pharmaceutical labels, vials and prescription medications.

15. The system of claim 10, wherein the printer is configured and arranged to print the dosing indicia along a bottom edge of the pharmaceutical label.

16. The system of claim 10, further comprising a code module configured and arranged to calculate a vial size based on the patient prescription information.

17. The system of claim 16, wherein the code module for calculating spacing for printing the dosing indicia is further configured and arranged to select a correct pharmaceutical label size based on the calculated vial size.

18. The system of claim 10, wherein the entry system further comprises a vial size entry field to be filed manually.

19. A pharmaceutical label, comprising:
   a substrate having a dimension; and
   a plurality of spaced-apart dosing indicia, indicting incremental doses in the prescription, formed on the substrate;
   the dosing indicia formed in a single, linear row on the substrate spaced-apart equally on one dimension of the substrate.

20. The pharmaceutical label of claim 19, further comprising an adhesive coating on a rear face of the substrate.

21. The pharmaceutical label of claim 19, wherein the pharmaceutical label is sized and dimensioned to wrap circumferentially around a cylindrical pill vial.

22. The pharmaceutical label of claim 19, wherein the plurality of space-apart indicia are formed on a bottom edge of the substrate.

* * * * *